Patented May 15, 1951

2,552,532

UNITED STATES PATENT OFFICE 2,552,532

PROCESS FOR BREAKING PETROLEUM EMULSIONS

Melvin De Groote, University City, Mo., assignor to Petrolite Corporation, Ltd., Wilmington, Del., a corporation of Delaware No Drawing. Application November 16, 1949, Serial No. 127,771

9 Claims. (Cl. 252—331)

This invention is a continuation-in-part of my two co-pending applications, Serial Nos. 104,801 and 104,802, both filed July 14, 1949.

Complementary to the aspect of the invention herein disclosed is my companion invention concerned with the new chemical products or compounds used as the demulsifying agents in the processes or procedures of the invention, as well as the application of such chemical compounds, products, or the like, in various other arts and industries, along with the method for manufacturing said new chemical products or compounds which are of outstanding value in demulsification. See my co-pending application, Serial No. 127,772, filed November 16, 1949.

The first of the aforementioned co-pending applications may be characterized by claim 1 of said co-pending application, which is as follows:

"A process for breaking petroleum emulsions of the water-in-oil type characterized by subjecting the emulsion to the action of a demulsifier including high molal oxypropylation derivatives of a member of the class consisting of monomeric polyhydric compounds and monomeric polyhydric derivatives thereof which bear a simple genetic relationship thereto, with the proviso that (a) the initial polyhydric reactant be free from any radical having at least 8 uninterrupted carbon atoms; (b) the initial polyhydric reactant have a molecular weight not over 1200 and at least 4 hydroxyl radicals; (c) the initial polyhydric reactant be water-soluble and xylene-insoluble; (d) the oxypropylation end product be water-insoluble and xylene-soluble; (e) the oxypropylation end product be within the molecular weight range of 2000 to 30,000 on an average statistical basis; (f) the solubility characteristics of the oxypropylation end product in respect to water and xylene be substantially the result of the oxypropylation step; (g) the ratio of propylene oxide per hydroxyl in the initial polyhydric reactant be within the range of 7 to 70; (h) the initial polyhydric reactant represent not more than 12½% by weight of the oxypropylation end product on a statistical basis, and (i) the preceding provisos being based on complete reaction involving the propylene oxide and the initial polyhydric reactant."

Claim 1 of the second co-pending application is substantially the same, except that it is concerned with the high molal oxypropylation derivatives as such and not specifically for demulsification.

Briefly stated, the present invention is concerned with the breaking of petroleum emulsions by means of certain polyol ethers hereinafter described in detail. Such ethers are obtained by the oxypropylation of a water-soluble xylene-insoluble polyhydric intermediate reactant derived by the oxyalkylation by means of ethylene oxide or glycide, or both, of a water-insoluble polyhydric initial reactant having at least 8 hydroxyl radicals and free from any radical having at least 8 uninterrupted carbon atoms. There is the further qualification that the intermediate reactants prior to oxypropylation have a molecular weight in excess of 1200, and preferably within the range of 1200 to 25,000.

A plurality of propylene oxide is used in molal ratio to the hydroxylated reactant so as to convert the initially water-soluble and xylene-insoluble intermediate product into an ultimate resultant which is at least colloidally water-soluble and xylene-soluble. For instance, the herein described resultants, or more correctly products of reaction since they invariably and inevitably represent cogeneric mixtures rather than a single component when mixed with distilled water so as to give a 5% solution, suspend after a fashion during vigorous agitation but on being allowed to stand in a quiescent state immediately separate out so that within a short length of time, for instance, within a few minutes to several hours, all or substantially the big bulk of material has separated from the aqueous solution or suspension. In fact, in the higher stages of oxypropylation the materials obtained seem to go into water at room temperature with considerable difficulty and if the water happens to be warm, for instance, at a temperature of 50°, 60° or 70° C., the materials are even less soluble. An example of a product difficult to disperse even with vigorous shaking and which, even so, does not stay dispersed, is the resultant obtained by treating one mole of sorbitol with 200 moles of propylene oxide. Reference as to solubility is in ordinary cold water at approximately room temperature, for instance, 22.5° C. or thereabouts. Solubility in xylene refers to solubility at ordinary temperature and products herein specified are soluble in xylene so as to form a 5% solution readily. In fact, such products have been employed in demulsification using a 50% solution in xylene.

For convenience, what is said hereinafter is divided into four parts. Part 1 is concerned with the description of the polyhydric reactants employed, as well as reference to other compounds, products, etc., so there may be a clear line of demarcation between the present invention and what may appear elsewhere.

Part 2 is concerned with the preparation of intermediate reactants by use of ethylene oxide or glycide, or both.

Part 3 is concerned with the preparation of the oxypropylated derivatives.

Part 4 is concerned with the use of an oxypropylated derivative as a demulsifier for petroleum emulsions of the water-in-oil type.

PART 1

Generally speaking, organic compounds having approximately the same number of oxygen atoms as carbon atoms are apt to be, and almost invariably are, water-soluble, and the most common could be illustrated by ethyl alcohol, methyl alcohol, acetic acid, acetone, formaldehyde, etc. When compounds reach enormously high molecular weights compared with such simple compounds, for instance, in the category of 30,000 to 50,000 or upward and preferably upward, such approximate ratio of carbon to oxygen does not necessarily guarantee water solubility as, for example, in the case of cellulose or possibly some starches. There are other classes of comparatively low molecular weight compounds, for instance, polypentaerythritols, varying from tri-pentaerythritol to deca-pentaerythritol, where the molecular weight varies roughly from 372 to 1200, which are not water-soluble in the ordinary sense. Pentaerythritol is fairly water-soluble, approximately 4% to 5% in water at ordinary temperature. Di-pentaerythritol is soluble to the extent of two-tenths of one per cent and is an initial material employed in the process or composition described in my aforementioned co-pending applications, Serial Nos. 104,801 and 104,802, both filed July 14, 1949. The higher pentaerythritols do not qualify as a raw material in the aforementioned copending applications for the reason they do not meet the specification as to water-solubility prior to oxypropylation.

The present invention then is concerned more specifically with the use of polypentaerythritol, tri-pentaerythritol, or higher pentaerythritols, by first subjecting these initial raw materials to reaction with ethylene oxide or glycide, or a mixture of the two so as to obtain an intermediate product which is water-soluble and xylene-insoluble and then subsequently treating such intermediate product with propylene oxide so as to convert the intermediate product into a final product, or end product, which is xylene-soluble.

Basically, the compounds herein described owe their peculiar properties, at least in part, to a number of factors as enumerated below:

(a) Size of molecule.

(b) Shape of molecule as far as space configuration goes.

(c) Absence of a single hydrophobe group having as many as 8 uninterrupted carbon atoms in a single radical.

(d) The product shows self-dispersibility or a moderate colloidal solubility or, indeed, even a high degree of colloidal solubility in water. The solubility at times, as hereinafter pointed out, compares with that of an ordinary soap solution.

(e) Solubility in xylene.

(f) The fact that the initial reactant requires the presence of at least 8 hydroxyl radicals.

(g) A water-insoluble compound is rendered water-soluble by action of ethylene oxide or glycide, or both, and (h) Such combination being obtained by a final reaction involving propylene oxide.

My preferred initial reactants are the polypentaerythritols as herein described. For purpose of convenience the word "polypentaerythritol" will mean those higher derivatives beginning with tri-pentaerythritol, up to and including the deca-pentaerythritols or other comparable members of the class. In essence, this simply excludes di-pentaerythritol for reasons previously noted. In this connection in regard to the preparation of polypentaerythritols attention is directed to U. S. Patent No. 2,462,049, dated February 15, 1949, to Wyler. For instance, this patent mentions, among other things, the following:

|  | Molecular weight |
|---|---|
| Tri-pentaerythritol | 372.41 |
| Tetra-pentaerythritol | 490.54 |
| Penta-pentaerythritol | 608.67 |
| Hexa-pentaerythritol | 726.80 |
| Hepta-pentaerythritol | 844.93 |
| Octa-pentaerythritol | 963.06 |
| Nona-pentaerythritol | 1,081.19 |
| Deca-pentaerythritol | 1,199.32 |

Other procedures have been described for preparing polypentaerythritol, using some other catalyst as described in British Patent No. 615,370 to Marrian and McLean (Imperial Chemical Industries, Ltd.).

The same catalyst as used in the above two mentioned issued patents illustrates a class of catalyst employed also to produce etherization in numerous other polyhydric compounds as, for example, in the case of polyglycerols, sorbitol, etc., etc. It is obvious that modified polypentaerythritol can be obtained by inter-mixing with another polyhydric alcohol, even though not water-insoluble, followed by etherization, to produce the higher molecular weight product. For instance, two moles of tripentaerythritol could be polymerized with one mole of glycol or diglycerol to give a modified hexa-pentaerythritol which, in essence, might be somewhat analogous to a hexa-pentaerythritol treated with glycide, although not necessarily so. Similarly, other polyhydric alcohols, such as sorbitol, sorbitan, mannitan, manitol, and tetramethylolhexanol can be employed, provided, however, that the resultant used as an initial reactant is water-insoluble, and xylene-insoluble, has at least 8 hydroxyls and a molecular weight in excess of 1200. Such materials can be varied in an inconsequential or insignificant sort of way without detracting from the structure of the final oxypropylated derivative, for instance, a number of the hydroxyl groups might be converted into an acetal or a ketal in the conventional manner; or one might produce an ester of a low molal acid, such as acetic acid, glycollic acid, lactic acid, propionic acid, etc. Tri-pentaerythritol could be treated with a mole of ethylene oxide or several moles of ethylene oxide, or a mole of glycide, or a mole of butyl oxide, or methyl glycide, and then subjected to polymerization so as to give materials which, obviously, are the chemical and also physical-chemical equivalent of the herein specified preferred and commercially available reactants, i. e., the polypentaerythritols.

My preferred reactants are tri-pentaerythritol which is sold commercially, and also a higher polypentaerythritol (average hydroxyl content 32.3). My third preferred reactant is the tetra-pentaerythritol manufactured in the manner described in Example 2 of aforementioned British Patent No. 615,370.

Incidentally, before proceeding with the description of the preparation of the intermediate by means of ethylene oxide or glycide or both as described in Part 2 following, I desire to point out that this same initial row material, which is water-insoluble and xylene-insoluble, can be treated directly with propylene oxide without the intermediate stage to yield oxypropylated derivatives which are valuable for demulsification and for other purposes and are not claimed in my aforementioned co-pending applications, Serial Nos. 104,801 and 104,802, both filed July 14, 1949.

This particular invention is described specifically and claimed in my co-pending applications, Serial Nos. 127,773, and 127,774, filed November 16, 1949. The ultimate derivatives are xylene-soluble but at no stage are the initial materials, nor intermediate products, or the final products, water-soluble within the ordinary meaning of the word to characterize minimum water-solubility.

PART 2

Part 2 is concerned with the production of water-soluble derivatives from tripentaerythritol or higher polypentaerythritols by reaction with ethylene oxide or glycide, or both. Part 3 is concerned with oxypropylation. Since the equipment used for oxyethylation and oxypropylation is essentially the same insofar that an autoclave with suitable arrangements for introduction of the reactant is employed this equipment will be described in the instant part of the specification and, thus, repetition avoided in Part 3.

Similarly, although pressure is not required in the introduction of glycide the same piece of equipment can be employed, using an open condenser as will be pointed out in the text.

I have prepared derivatives of the kind described in here on a scale varying from a few hundred grams or less in the laboratory, to hundreds of pounds on a plant scale. The same applies in the preparation of the oxyalkylated compounds which are concerned with the third part of the text. In preparing a large number of examples I have found it particularly advantageous to use laboratory equipment which permits continuous oxypropylation and oxyethylation. More specific reference will be made to treatment with glycide subsequently in the text. The oxypropylation step is, of course, the same as the oxyethylation step insofar that low boiling liquids are handled in each instance. What immediately follows refers to oxyethylation and it is understood that oxypropylation can be handled conveniently in exactly the same manner.

The oxyethylation procedure employed in the preparation of derivatives of the preceding intermediates has been uniformly the same, particularly in light of the fact that a continuous operating procedure was employed. In this particular procedure the autoclave was a conventional autoclave, made of stainless steel and having a capacity of approximately one gallon, and a working pressure of 1,000 pounds gauge pressure. The autoclave was equipped with the conventional devices and openings, such as the variable stirrer operating at speeds from 50 R. P. M. to 500 R. P. M., thermometer well and thermocouple for mechanical thermometer; emptying outlet; pressure gauge, manual vent line; charge hole for initial reactants; at least one connection for conducting the incoming alkylene oxide, such as ethylene oxide, to the bottom of the autoclave; along with suitable devices for both cooling and heating the autoclave, such as a cooling jacket and, preferably coils in addition thereto, with the jacket so arranged that it is suitable for heating with steam or cooling with water, and further equipped with electrical heating devices. Such autoclaves are, of course, in essence small scale replicas of the usual conventional autoclave used in oxyalkylation procedures.

Continuous operation, or substantially continuous operation, is achieved by the use of a separate container to hold the alkylene oxide being employed, particularly ethylene oxide. The container consists essentially of a laboratory bomb having a capacity of about one-half gallon, or somewhat in excess thereof. This bomb was equipped, also, with an inlet for charging, and an outlet tube going to the bottom of the container so as to permit discharging of alkylene oxide in the liquid phase to the autoclave. Other convenient equipment consists, of course, of the rupture disc, pressure gauge, sight feed glass, thermometer, connection for nitrogen for pressuring bomb, etc. The bomb was placed on a scale during use and the connections between the bomb and the autoclave were flexible stainless steel hose or tubing so that continuous weighings could be made without breaking or making any connections. This also applied to the nitrogen line, which was used to pressure the bomb reservoir. To the extent that it was required, any other usual conventional procedure or addition which provided greater safety was used, of course, such as safety glass, protective screens, etc.

With this particular arrangement practically all oxyethylations become uniform in that the reaction temperature could be held within a few degrees of any selected point in this particular range.

In the early stages where the concentration of catalyst is high the temperature was generally set for around 150° C. or thereabouts. Subsequently, temperatures up to 170° C. or higher may be required. It will be noted by examination of subsequent examples that this temperature range was satisfactory. In any case, where the reaction goes more slowly a higher temperature may be used, for instance 165° C. to 180° C., and if need be 185° C. to 190° C. Incidentally, oxypropylation takes place more slowly than oxyethylation as a rule and for this reason we have used a temperature of approximately 160° C. to 165° C., as being particularly desirable for initial oxyethylation, and have stayed within the range of 165° C. to 185° C., almost invariably during oxypropylation. The ethylene oxide was forced in by means of nitrogen pressure as rapidly as it was absorbed as indicated by the pressure gauge in the autoclave. In case the reaction slowed up the temperature was raised so as to speed up the reaction somewhat by use of extreme heat. If need be, cooling water was employed to control the temperature.

As previously pointed out in the case of oxypropylation as differentiated from oxyethylation, there was a tendency for the reaction to slow up as the temperature dropped much below the selected point of reaction, for instance, 170° C. In this instance the technique employed was the same as before, that is, either cooling water was cut down or steam was employed, or the addition of propylene oxide speeded up, or electric heat used in addition to the steam in order that the reaction proceeded at, or near, the selected temperatures to be maintained.

Inversely, if the reaction proceeded too fast regardless of the particular alkylene oxide, the amount of reactant being added, such as ethylene oxide, was cut down or electrical heat was cut off, or steam was reduced, or if need be cooling water was run through both the jacket and the cooling coil. All these operations, of course, are dependent on the required number of conventional gauges, check valves, etc., and the entire equipment, as has been pointed out, is conventional and, as far as I am aware, can be furnished by at least two firms who specialize in the manufacture of this kind of equipment.

Attention is directed to the fact that the use of glycide requires extreme caution. This is particularly true on any scale other than small laboratory scale or semi-pilot plant operations. Purely from the standpoint of safety in the handling of glycide, attention is directed to the following: (a) If prepared from glycerol monochlorohydrin, this product should be comparatively pure; (b) the glycide itself should be as pure as possible as the effect of impurities are difficult to evaluate; (c) the glycide should be introduced carefully and precaution should be taken that it reacts as promptly as introduced, i. e., that no excess of glycide is allowed to accumulate; (d) all necessary precaution should be taken that glycide cannot polymerize per se; (e) due to the high boiling point of glycide one can readily employ a typical separatable glass resin pot as described in the co-pending application of Melvin De Groote and Bernhard Keiser, Serial No. 8,722, filed February 16, 1948 (now Patent No. 2,499,365, dated March 7, 1950), and offered for sale by numerous laboratory supply houses. If such arrangement is used to prepare laboratory scale duplications, then care should be taken that the heating mantle can be removed rapidly so as to allow for cooling; or better still, through an added opening at the top, the glass resin pot or comparable vessel should be equipped with a stainless steel cooling coil so that the pot can be cooled more rapidly than by mere removal of mantle. If a stainless steel coil is introduced it means that conventional stirrer of the paddle type is changed into the centrifugal type which causes the fluid or reactants to mix due to swirling motion in the center of the pot. Still better is the use of a laboratory autoclave of the kind previously described in this part; but in any event, when the initial amount of glycide is added to a suitable reactant, the speed of reaction should be controlled by the usual factors, such as (a) the addition of glycide; (b) the elimination of external heat, and (c) use of cooling coil so there is no undue rise in temperature. All the foregoing is merely conventional but is included due to the hazard in handling glycide.

*Example 1a*

The reaction vessel employed was a stainless steel autoclave with the usual devices for heating, heat control, stirrer, inlet, outlet, etc., which is conventional in this type of apparatus. The capacity was approximately 3½ liters. The stirrer operated at a speed of approximately 300–350 R. P. M. There were charged into the autoclave 373 grams of tripentaerythritol along with 365 grams of solvent. In this instance xylene was used. Any nonvolatile inert solvent, such as xylene, decalin, diethylether of ethylene glycol, or a higher boiling aromatic solvent, such as mesitylene, can be used. Approximately 10 grams of catalyst were added. Sodium methylate was used, although ground caustic soda or ground caustic potash, or any one of a number of other alkaline catalysts are equally suitable. The autoclave was sealed, swept with nitrogen gas, and stirring started immediately and heat applied, and the temperature allowed to rise to approximately 150° C. At this point addition of ethylene oxide was started. It was added continuously at such speed that it was absorbed by the reaction as rapidly as added.

The oxide was run in so that the rate of absorption was approximately 20 grams per minute. The temperature range was controlled within 150° to 200° C. and the pressure did not go in excess of 100 pounds at any time except, perhaps, momentarily reaching 110 to 130 pounds. The total amount of ethylene oxide added was 1100 grams. This experiment was included in the table which follows. In some instances the ethylene oxide was added batchwise, hence the pressure developed at times to 200 or 300 pounds gauge pressure.

The same procedure was followed in other experiments except that two larger autoclaves were used in the subsequent experiments, to wit, a 10-liter autoclave and also a 5-gallon autoclave. The working arrangement on this larger autoclave was the same as in the small one but the rate of ethylene oxide addition could be speeded up distinctly, for instance, when using a 10-liter auotclave ethylene oxide was introduced at the rate of 30 to 40 grams per minute, and in the larger autoclave at the rate of approximately 1 to 2 pounds, or about 450 to 1,000 grams, per minute. Since the larger autoclaves were more heavily built there was, of course, less danger of any undue hazard and, also apparently although the speed of stirring may be roughly the same as in larger autoclaves possibly the stirrer design gives more effective mixture. These are obvious variations which take place in any conventional autoclave with a stirrer. It would be immaterial, of course, if the ethylene oxide had been added more slowly except that a greater period of time would have been involved.

*Example 4a*

Note that experiments 2a and 3a are omitted for the reason that they appear in the table and this example is included because it is the first one of the series shown in the table obtained by using glycide only.

The same piece of equipment was used as previously described, i. e., an autoclave, although in the instant experiment involving the use of glycide there was no pressure involved and certain changes were made as noted subsequently. The autoclave was equipped with a water-cooled condenser which was shut off when used as an autoclave. It was also equipped with a separatory funnel and an equalizing pressure tube so that liquid, such as glycide, could be fed continuously at a dropwise or a faster rate into the vessel and the rate was controlled by visual examination. For convenience, this piece of equipment is referred to as an autoclave because it was designed essentially for such use but it is to be noted it was not so used when glycide was employed as the alkylene oxide.

There were charged into the autoclave the same reactants (intermediate, solvent, and sodium methylate) as in Example 1a. The autoclave was sealed, swept with nitrogen gas and stirring started immediately and heat applied. The temperature was allowed to rise to 120° C. The glycide employed was comparatively pure. 1850 grams of glycide were used. This was charged into the upper reservoir vessel which had been previously flushed out with nitrogen and was the equivalent of a separatory funnel. The glycide was started slowly into the reaction mass in a dropwise stream. The reaction started to take place immediately and the temperature rose approximately 10° to 15°. Cooling water was run through the coils so that the temperature for addition of glycide was controlled within the range roughly of 110° C. to 130° C. The addition was continuous within the limitations and all the glycide was added in less than 2 hours. This reaction took place at atmospheric pressure with simply a small stream of nitrogen passing into the autoclave at the very top and passing out through the open condenser so as to avoid any possible entrance of air.

It is believed that one could add a mixture of ethylene oxide and glycide under the same conditions as ethylene oxide is added, i. e., using the equipment as an autoclave. However, since the glycide is generally more reactive than the ethylene oxide there does not appear to be any advantage in such particular procedure and in instances where both ethylene oxide and glycide were employed the procedure has been conducted both ways, i. e., adding the glycide first and then the ethylene oxide, or the other way around, that is, adding the ethylene oxide first and then the glycide. Needless to say, the oxyethylated chain introduced into the polypentaerythritol molecule must necessarily vary depending on whether the glycide was added first or the ethylene oxide. In any event, the final product must be obviously water-soluble in a manner entirely differentiated from the initial reactant. In the table the molecular weight, of course, is an average molecular weight based on the assumption that the reaction goes to completion between the initial raw material and the oxyalkylating agent.

An attempt was made to obtain a pure decapentaerythritol by reaction between two moles of penta-penta-erythritol. The exact composition of this derivative is not known but soluble products were derived which apparently had a molecular weight, on the basis aforementioned, of approximately 20,000. Needless to say, one need not stop with initial water-solubility but there could be some enhanced water-solubility over the minimum point by merely further oxyalkylating with ethylene oxide or glycide, or both. For this reason in the specification the molecular weight of the intermediate has been set within a range of over 1200 to 25,000.

In regard to the speed of reaction, temperature of reaction and reaction pressures (in the case of ethylene oxide or propylene oxide) attention is directed to the fact that the amount of catalyst used is rather significant. It is usually practical to start a reaction with one, two or three per cent of an alkaline catalyst, such as sodium methylate, based on the amount of reaction. Subsequently if the reaction slows down or takes too high a temperature, or pressures appear to be unduly high, it probably indicates that more catalyst should be added. In numerous instances 2% of catalyst is started at the beginning of the reaction and at the final stage probably not more than 1/4% or 1/3% is present, which is usually enough but, as has been pointed out, more can be added at an intermediate stage.

| Ex. No. | Polypentaerythritol | Empirical Formula | Molecular Wt. | No. of Hydroxyls | Gms. Used in Example | Solvent (Xylene), Gms. | Catalyst (Sod. Meth.), Gms. | EtO Added, Gms. | Molar Ratio EtO to Hydroxyl | Glycide Added, Gms. | Molar Ratio Glycide to Hydroxyl | Molar Ratio Total Alkylene Oxide to Hydroxyl | Molar Wt. Final Stage of Intermediate |
|---|---|---|---|---|---|---|---|---|---|---|---|---|---|
| 1a | Tri | C15H32O10 | 372.4 | 8 | 373 | 375 | 5 | 1,100 | 3:1 | 0 | 0 | 3:1 | 1,470 |
| 2a | Tri | do | 372.4 | 8 | 373 | 375 | 5 | 720 | 2:1 | 590 | 1:1 | 3:1 | 1,680 |
| 3a | Tri | do | 372.4 | 8 | 373 | 375 | 6 | 360 | 1:1 | 1,180 | 2:1 | 3:1 | 1,910 |
| 4a | Tri | do | 372.4 | 8 | 373 | 375 | 5 | 0 | 0 | 1,850 | 3:1 | 3:1 | 2,720 |
| 5a | Tetra | C20H42O13 | 490.5 | 10 | 490 | 500 | 8 | 2,000 | 4.5:1 | 0 | 0 | 4.5:1 | 2,490 |
| 6a | Tetra | do | 490.5 | 10 | 490 | 500 | 10 | 1,325 | 3:1 | 1,480 | 2:1 | 5:1 | 3,295 |
| 7a | Tetra | do | 490.5 | 10 | 490 | 500 | 10 | 880 | 2:1 | 2,225 | 3:1 | 5:1 | 3,595 |
| 8a | Tetra | do | 490.5 | 10 | 490 | 500 | 16 | 0 | 0 | 3,000 | 4:1 | 5:1 | 3,490 |
| 9a | Hepta | C35H72O22 | 845 | 16 | 845 | 850 | 20 | 6,340 | 9:1 | 0 | 0 | 9:1 | 7,185 |
| 10a | Hepta | do | 845 | 16 | 845 | 850 | 20 | 5,640 | 8:1 | 1,185 | 1:1 | 9:1 | 7,670 |
| 11a | Hepta | do | 845 | 16 | 845 | 850 | 20 | 4,500 | 7:1 | 2,375 | 2:1 | 9:1 | 7,720 |
| 12a | Hepta | do | 845 | 16 | 845 | 850 | 20 | 4,360 | 6:1 | 3,650 | 3:1 | 9:1 | 8,855 |
| 13a | Hepta | do | 845 | 16 | 845 | 850 | 20 | 2,820 | 4:1 | 5,335 | 4.5:1 | 8.5:1 | 9,000 |
| 14a | Hepta | do | 845 | 16 | 845 | 850 | 25 | 2,115 | 3:1 | 6,525 | 5.5:1 | 8.5:1 | 9,485 |
| 15a | Hepta | do | 845 | 16 | 845 | 850 | 25 | 0 | 0 | 9,500 | 8:1 | 8:1 | 10,345 |

The intermediate products obtained in the manner above described are invariably xylene-insoluble but show a distinct tendency to disperse or become soluble in water. At times the solubility in water approximates that of an ordinary soap or starch solution; although this characterization is just approximate there is absolutely no confusion with the insolubility of the original polypentaerythritol used as the raw material. Even if ground to a fine mesh, for instance, 200 mesh or finer, and shaken in water they simply represent coarse suspensions and nothing more. The product obtained as an intermediate contains solvent which can be readily removed by vacuum distillation. If the solvent happens to be xylene as in the previous examples a temperature of 180° to 200° C. is perfectly satisfactory. During this initial stage the products seem darken and the intermediate is usually a viscous, somewhat sirupy product of an amber, dark brown, or reddish brown color. The color may be due to a trace of iron because of contamination from the vessel employed. However, even when stainless steel is employed of such character that contamination by iron seems out of the question, there is still discolorization, probably due to the inherent nature of the initial raw or a subsequent caramelization-like reaction.

Intermediates can be decolorized in the usual manner by treating with charcoal, filtering clay, or the like. If such procedure is employed it is generally more desirable to use it after the final stage, i. e., after the oxypropylation has been completed. No such refinement was employed in connection with the above samples.

PART 3

This section is concerned with the oxypropylation of the intermediates obtained as described in Part 2 immediately preceding. The equipment, reaction conditions, etc., have been specified already.

In the series of examples noted in the subsequent table it has been found expedient to use more than one size autoclave, that is, a size of about 3½ liters, a 2½ gallon size, and a 5-gallon size.

Previous reference has been made to the arrangement used when oxyalkylation is conducted with glycide by simply changing the position of the reflux condenser or some other suitable trap arrangement so the xylene employed as a solvent can be readily removed. For convenience, in the subsequent experiments the xylene was removed although this is unnecessary for reasons above indicated unless required by ultimate use of the final product. In experiments noted in the table approximately one-tenth of a gram molecular weight was taken as the initial starting weight, i. e., the intermediate described in Part 2, preceding. The amount of propylene oxide added in each instance was approximately 10 moles, or 575–585 grams. Since this was added to one-tenth of a gram molecular weight equivalent the ratio is the same as if 100 moles of propylene oxide were added per gram molecular weight of the intermediate.

For convenience, in the table there is also noted the molal ratio of propylene oxide to other alkylene oxide based on the hydroxyl number of the initial reactant, i. e., the polypentaerythritol initially employed. It will be noted that the table shows molecular weight variations ranging from 7,000 to approximately 54,000. All the products were xylene soluble.

Oxypropylation of the intermediate sometimes yields products which show considerably decreased water solubility and sometimes even seem to approach water insolubility, but no attempt has been made to define this particular solubility as being markedly different than the water solubility of the intermediate. There is, of course, an enormous difference between the water-solubility of the initial raw material, i. e., the polypentaerythritol which, in fact, is not water-soluble at all.

The amount of catalyst employed is noted in grams. Generally speaking, approximately 2½% to 3% by weight of sodium methylate was added to the initial charge, i. e., the intermediate obtained as described in Part 2. Whenever the amount of catalyst fell below one-half of one per cent, more was added.

It will be noted that the amount of catalyst actually present is higher than indicated by the figures for the reason that there is residual catalyst left over from the intermediate step in Part 2.

The temperatures, pressure, and time of reaction have been indicated previously in Part 2 for the reason that the same equipment is used in oxypropylation as in oxyethylation. In the use of the small autoclave approximately 20 grams of propylene oxide were added per minute; in the use of the larger autoclave (2½ gallon size) the rate was increased to approximately 30 to 35 grams per minute; in the largest autoclave (5 gallons) about 300 to 700 grams of propylene oxide were added per minute.

As has been pointed out previously, the rate of reaction, the pressures, and temperatures, all are related to the time required for reaction and under the conditions previously indicated the amount of catalyst used above is more than ample for perfectly satisfactory working conditions, for example, temperatures, pressures, etc., as indicated in Part 2 in connection with oxyalkylation as herein described.

There is, however, a factor which enters into oxypropylation in this series of experiments which is not obvious or significant in Part 2 and that is the size of the molecule. The reaction obviously must take place at the terminal hydroxyl. If one starts, for example, with heptapolypentaerythritol having 16 hydroxyls and oxyethylates as described in Part 2, and then oxypropylates, it becomes obvious that there are present and susceptible to reaction 16 hydroxyl groups per molecule and no more. As the molecule grows larger the opportunity for reaction by random collision decreases. Ordinarily, this may not be a factor but I have noticed that as one passes the 20,000 molecular weight range, and particularly the range between 20,000 and 50,000, adding catalyst is much less effective than in the lower molecular weight range. In other words, the reaction cannot be speeded up necessarily to any great degree by increasing the amount of catalyst from ¾% to 1¼%. The reaction apparently is slow due to the size of the molecule. Needless to say, this view is in the nature of speculation and may be entirely wrong. Such delayed activity may reside with some other cause. However, from a practical standpoint no advantage has been found and derivatives much beyond a 50,000 molecular weight based on a statistical average and completeness of reaction are not justified in light of cost. For reasons of exploration some have been made in the 100,000 molecular weight range but the slowness of reaction places this type at a disadvantage in light of the increased cost of manufacture. If glycide is used in the intermediate stage additional hydroxyl radicals are formed and, presumably, the secondary hydroxyls are as reactive as the primary hydroxyls. This effect tends to offset the reduction in reaction speed due to molecule size. However, glycide is more expensive than ethylene oxide and for this reason such manipulative procedure is more costly.

| Ex. No. | Ex. No. Reactant | Amt. Taken Gms. (Solvent-Free) | Molecular Wt. of Reactant | Gms. Molecular Wt. Equiv. Used | Propylene Oxide, Gms. | Propylene Oxide in Moles | Molar Ratio Propylene Oxide to other Alkylene Oxide Based on Original Hydroxyl Group | Catalyst (Sodium Methylate), Gms. | Molar Wt. of Reaction Product | Xylene Soluble |
|---|---|---|---|---|---|---|---|---|---|---|
| 1b | 1a | 147 | 1,470 | .1 | 575-585 | 10 | 4.2 | 5 | 7,270 | Yes |
| 2b | 1b | 725 | 7,270 | .1 | 575-585 | 10 | 8.3 | | 13,070 | Yes |
| 3b | 2b | 1,305 | 13,070 | .1 | 575-585 | 10 | 12.5 | | 18,870 | Yes |
| 4b | 3b | 1,885 | 18,870 | .1 | 575-585 | 10 | 16.7 | 5 | 24,670 | Yes |
| 5b | 4b | 2,465 | 24,670 | .1 | 575-585 | 10 | 20.8 | | 30,470 | Yes |
| 6b | 5a | 249 | 2,490 | .1 | 575-585 | 10 | 2.2 | 8 | 8,290 | Yes |
| 7b | 6b | 830 | 8,290 | .1 | 575-585 | 10 | 4.4 | | 14,090 | Yes |
| 8b | 7b | 1,410 | 14,090 | .1 | 575-585 | 10 | 6.7 | | 19,890 | Yes |
| 9b | 8b | 1,990 | 19,890 | .1 | 575-585 | 10 | 8.9 | 7 | 25,690 | Yes |
| 10b | 9b | 2,570 | 25,690 | .1 | 575-585 | 10 | 11.1 | | 31,490 | Yes |
| 11b | 10b | 3,150 | 31,490 | .1 | 575-585 | 10 | 13.3 | 5 | 37,290 | Yes [1] |
| 12b | 9a | 718.5 | 7,185 | .1 | 575-585 | 10 | .7 | 17 | 12,985 | Yes |
| 13b | 12b | 1,300 | 12,985 | .1 | 575-585 | 10 | 1.39 | | 18,785 | Yes |
| 14b | 13b | 1,880 | 18,785 | .1 | 575-585 | 10 | 2.07 | | 24,585 | Yes |
| 15b | 14b | 2,460 | 24,585 | .1 | 575-585 | 10 | 2.78 | 10 | 30,385 | Yes |
| 16b | 15b | 3,040 | 30,385 | .1 | 575-585 | 10 | 3.47 | | 36,185 | Yes [1] |
| 17b | 16b | 3,620 | 36,185 | .1 | 575-585 | 10 | 4.19 | | 41,985 | Yes [1] |
| 18b | 17b | 4,200 | 41,985 | .1 | 575-585 | 10 | 4.85 | 7 | 47,785 | Yes [1] |
| 19b | 18b | 4,780 | 47,785 | .1 | 575-585 | 10 | 5.56 | | 53,585 | Yes [1] |
| 20b | 10a | 767.0 | 7,670 | .1 | 575-585 | 10 | .7 | 18 | 13,470 | Yes |
| 21b | 20b | 1,350 | 13,470 | .1 | 575-585 | 10 | 1.39 | | 19,270 | Yes |
| 22b | 21b | 1,925 | 19,270 | .1 | 575-585 | 10 | 2.07 | | 25,070 | Yes |
| 23b | 22b | 2,505 | 25,070 | .1 | 575-585 | 10 | 2.78 | 10 | 30,870 | Yes |
| 24b | 23b | 3,090 | 30,870 | .1 | 575-585 | 10 | 3.47 | | 36,670 | Yes [1] |
| 25b | 24b | 3,670 | 36,670 | .1 | 575-585 | 10 | 4.19 | | 42,470 | Yes [1] |
| 26b | 25b | 4,250 | 42,470 | .1 | 575-585 | 10 | 4.85 | 10 | 48,270 | Yes [1] |
| 27b | 11a | 772 | 7,720 | .1 | 575-585 | 10 | .7 | 20 | 13,520 | Yes |
| 28b | 27b | 1,350 | 13,520 | .1 | 575-585 | 10 | 1.39 | | 19,320 | Yes |
| 29b | 28b | 1,930 | 19,320 | .1 | 575-585 | 10 | 2.07 | | 25,120 | Yes |
| 30b | 29b | 2,510 | 25,120 | .1 | 575-585 | 10 | 2.78 | | 30,920 | Yes |
| 31b | 30b | 3,090 | 30,920 | .1 | 575-585 | 10 | 3.47 | 5 | 36,720 | Yes [1] |
| 32b | 31b | 3,670 | 36,720 | .1 | 575-585 | 10 | 4.19 | | 42,520 | Yes [1] |
| 33b | 32b | 4,250 | 42,520 | .1 | 575-585 | 10 | 4.85 | 5 | 48,320 | Yes [1] |
| 34b | 33b | 4,830 | 48,320 | .1 | 575-585 | 10 | 5.56 | | 54,120 | Yes [1] |

[1] Denotes colloidal water solubility.

In the preparation of the above compounds practically without exception when the molecular weight reaches 35,000 or more the products give an excellent colloidal solution in water comparable, in fact, with an ordinary soap solution in many ways. For instance, such characteristic solubility is shown very clearly by compound Example 16b, which can be prepared entirely from commercially available chemical products, i. e., hepta-pentaerythritol, ethylene oxide and propylene oxide.

My preferred final products are those which show at least colloidal solubility as illustrated by Example 16b as far as synergistic or emulsion promoting properties are concerned. However, for demulsification I prefer lower molecular weights, in the range of approximately 20,000 to 25,000.

The products above described are viscous amber colored liquids which, in fact, are similar to those derived at the intermediate stage. The color varies from deep yellow or light amber to amber, dark amber, or reddish amber. The viscosity varies somewhat from that of castor oil to that of blown castor oil. The products can be bleached in the customary manner by use of charcoal, filter clays, or the like. If a solvent is used initially with a polypentaerythritol to give a slurry which is convenient to handle, such solvent can remain in the final product or be removed by vacuum distillation. However, my preference is, if desirable to remove the solvent, to do so at the end of the intermediate stage.

It is obvious that certain modifications can be made which do not depart from the spirit of the invention. The initial raw materials, i. e., the specified polypentaerythritols or modifications thereof which bear a simple genetic relationship to the polypentaerythritols are water-insoluble materials. They are water-insoluble and xylene-insoluble materials. Such initial reactants are treated in the manner described to yield materials which are water-dispersible or in which the water-solubility is at least completely differentiated from that of the original products. At this stage the intermediates are still xylene-insoluble. They are then converted into xylene-soluble materials. It is perfectly obvious that if one treats a material as described in the first table with ethylene oxide or glycide or a combination, that a small percentage of the oxide could be replaced by another oxide, as for example, propylene oxide. For instance, note that one of the initial materials, for instance, Example 9a, has a molecular weight of approximately 7200. In the introduction of approximatel 144 moles of ethylene oxide a few of such moles of ethylene oxide could be replaced at an earlier intermediate stage with propylene oxide without particularly affecting the specified characteristics. Needless to say, such variation would not be departing from the spirit of the invention in the slightest.

Likewise, Example 9a is oxypropylated subsequently to give Examples 12b, 13b, 14b, etc. Example 14b has a molecular weight of about 25,000. It goes without saying that a mole or two of ethylene oxide, or a mole or two of glycide, could be used in course of such procedure without particularly affecting the characteristic properties of the product. Here, again, such minor variation does not represent departure from the spirit of the invention.

If one examines the previous tables it becomes evident that the original insoluble constituent, i. e., the polypentaerythritol, such as tri-pentaerythritol, may contribute as little as 1% or less, of the final product. For instance, in Example 1a tri-pentaerythritol was treated with ethylene oxide so as to increase the molecular weight from 372 to 1470.

In the series of experiments beginning with 1b through 5b, a product was obtained whose molecular weight was approximately 30,000. Obviously had this example, i. e., 5b, been taken one stage further the percentage contributed by the original tri-pentaerythritol would have been under 1%. The upper range is approximately 5%, i. e., the initial reactant contributes from a fraction of 1% up to 5%, 6% or 7% of the final end product.

It is also to be noted that the general range of preferred examples shows that the alkylene oxide added in the preparation of the intermediate is within the range roughly of 3 to 1 to 9 to 1, or in some instances 12 to 1. Likewise, the amount of propylene oxide added in proportion to the ethylene oxide or glycide, or both, varies from less than one up to 20 to 1, or 25 to 1.

PART 4

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are used frequently in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce a clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 14b, with 15 parts by weight of xylene and 10 parts by weight of isopropyl alcohol, an excellent demulsifier is obtained. Selection of the solvent will vary depending upon the solubility characteristics of the oxyalkylated product, and of course will be dictated in part by economic considerations, i. e., cost.

As noted above, the products herein described may be used not only in diluted form, but also may be used admixed with some other chemical demulsifier. For example, a mixture which exemplifies such combination is the following:

Oxypropylated derivative, for example, the product described as Example 14b, 30%;

A cyclohexylamine salt of a polypropylated naphthalene monosulfonic acid, 20%;

An oil-soluble petroleum sulfonic acid sodium salt, 20%;

Isobutyl alcohol, 5%;

High boiling aromatic solvent, 25%.

The above proportions are all weight per cents.

Having thus described my invention, what I claim as new and desire to secure by Letters Patent, is

1. A process for breaking petroleum emulsions of the water-in-oil type characterized by subjecting the emulsion to the action of a demulsifier including high molal oxypropylation derivatives of oxyalkylated intermediates; said oxyalkylated intermediates being derived in turn from water-insoluble, xylene-insoluble, polypentaerythritols having at least 8 hydroxyl radicals, and derivatives which bear a simple genetic relationship thereto, with the proviso that (a) the initial polyhydric reactant be free from any radical having at least 8 uninterrupted carbon atoms; (b) the intermediate having a molecular weight in excess of 1200 and less than 25,000; (c) the intermediate product be obtained by an oxyalkylation step involving a member of the class consisting of ethylene oxide and glycide; (d) the intermediate product be water-dispersible, at least to the extent of colloidal solubility, and be xylene-insoluble; (e) the solubility characteristics of the intermediate in respect to water be substantially the result of the oxyalkylation step employing a member of the class consisting of ethylene oxide and glycide; (f) the oxypropylation end product be within the molecular weight range of 5,000 to 100,000 on an average statistical basis; (g) the oxypropylation end product be xylene-soluble; (h) the xylene solubility characteristics of the oxypropylation end product be substantially the result of the oxypropylation step; (i) the initial polyhydric reactant represent not more than 7% by weight of the oxypropylation end product on a statistical basis, and that (j) the preceding provisos be based on complete reaction involving the alkylene oxides and the initial polyhydric reactant.

2. A process for breaking petroleum emulsions of the water-in-oil type characterized by subjecting the emulsion to the action of a demulsifier including high molal oxypropylation derivatives of oxyalkylated intermediates; said oxyalkylated intermediates being derived in turn from water-insoluble, xylene-insoluble polypentaerythritols having at least 8 hydroxyl radicals, with the proviso that (a) the initial polyhydric reactant be free from any radical having at least 8 uninterrupted carbon atoms; (b) the intermediate have a molecular weight in excess of 1200 and less than 25,000; (c) the intermediate product be obtained by an oxyalkylation step involving a member of the class consisting of ethylene oxide and glycide; (d) the intermediate product be water-dispersible, at least to the extent of colloidal solubility, and be xylene-insoluble; (e) the solubility characteristics of the intermediates in respect to water be substantially the result of the oxyalkylation step employing a member of the class consisting of ethylene oxide and glycide; (f) the oxypropylation end product be within the molecular weight range of 5,000 to 100,000 on an average statistical basis; (g) the oxypropylation end product be xylene-soluble; (h) the xylene solubility characteristics of the oxypropylation end product be substantially the result of the oxypropylation step; (i) the initial polyhydric reactant represent not more than 7% by weight of the oxypropylation end product on a statistical basis, and that (j) the preceding provisos be based on complete reaction involving the alkylene oxides and the initial polyhydric reactant.

3. The process of claim 2 wherein the alkylene oxide employed to produce the intermediate is ethylene oxide.

4. The process of claim 2 wherein the alkylene oxide employed to produce the intermediate is ethylene oxide, and the ratio of ethylene oxide to initial hydroxyl radical is within the range of 3 to 1 to 12 to 1.

5. The process of claim 2 wherein the alkylene oxide employed to produce the intermediate is ethylene oxide, the ratio of ethylene oxide to initial hydroxyl radical is within the range of 3 to 1 to 12 to 1, and the ratio of propylene oxide to ethylene oxide is within the range of less than 1 to 1 up to 25 to 1.

6. The process of claim 2 wherein the alkylene oxide employed to produce the intermediate is ethylene oxide, the ratio of ethylene oxide to initial hydroxyl radical is within the range of 3 to 1 to 12 to 1, the ratio of propylene oxide to ethylene oxide is within the range of less than 1 to 1 up to 25 to 1, and with the proviso that the molecular weight of the end product is within the range of 20,000 to 30,000.

7. The process of claim 2 wherein the alkylene oxide employed to produce the intermediate is ethylene oxide, the ratio of ethylene oxide to initial hydroxyl radical is within the range of 3 to 1 to 12 to 1, the ratio of propylene oxide to ethylene oxide is within the range of less than 1 to 1 up to 25 to 1, and with the proviso that the polypentaerythritol employed as the initial reactant is tri-pentaerythritol.

8. The process of claim 2 wherein the alkylene oxide employed to produce the intermediate is ethylene oxide, the ratio of ethylene oxide to initial hydroxyl radical is within the range of 3 to 1 to 12 to 1, the ratio of propylene oxide to ethylene oxide is within the range of less than 1 to 1 up to 25 to 1, and with the proviso that the polypentaerythritol employed as the initial reactant is tetra-pentaerythritol.

9. The process of claim 2 wherein the alkylene oxide employed to produce the intermediate is ethylene oxide, the ratio of ethylene oxide to initial hydroxyl radical is within the range of 3 to 1 to 12 to 1, the ratio of propylene oxide to ethylene oxide is within the range of less than 1 to 1 up to 25 to 1, and with the proviso that the polypentaerythritol employed as the initial reactant is hepta-pentaerythritol.

MELVIN DE GROOTE.

REFERENCES CITED

The following references are of record in the file of this patent:

UNITED STATES PATENTS

| Number | Name | Date |
|---|---|---|
| 2,233,383 | De Groote et al. | Feb. 25, 1941 |
| 2,278,838 | De Groote et al. | Apr. 7, 1942 |
| 2,281,419 | De Groote et al. | Apr. 28, 1942 |
| 2,307,058 | Moeller | Jan. 5, 1943 |
| 2,430,002 | De Groote et al. | Nov. 4, 1947 |
| 2,454,541 | Bock et al. | Nov. 23, 1948 |